E. H. ANGLE & A. H. KETCHAM.
ANNEALING AND TEMPERING APPARATUS.
APPLICATION FILED MAY 6, 1914.
1,112,750.
Patented Oct. 6, 1914.
2 SHEETS—SHEET 1.
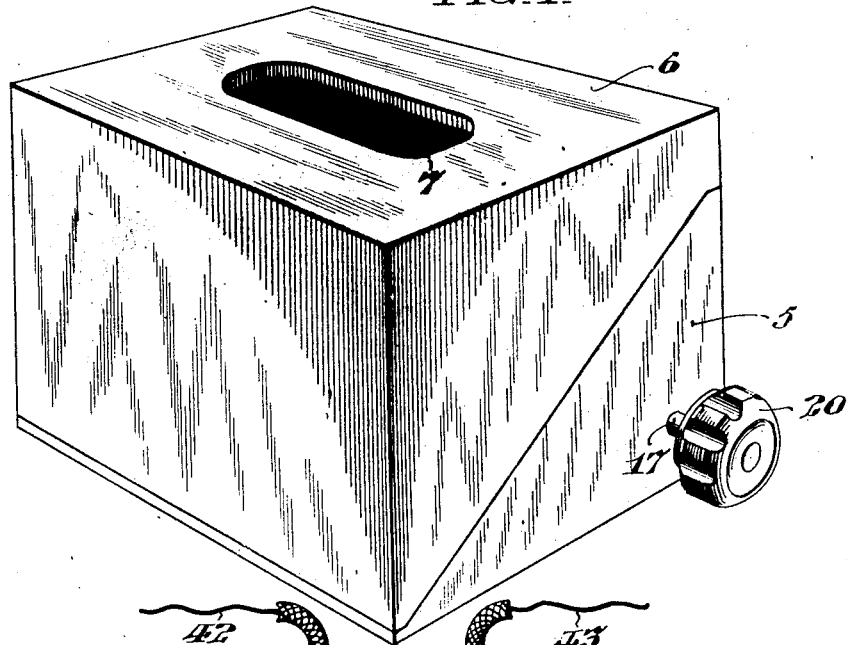
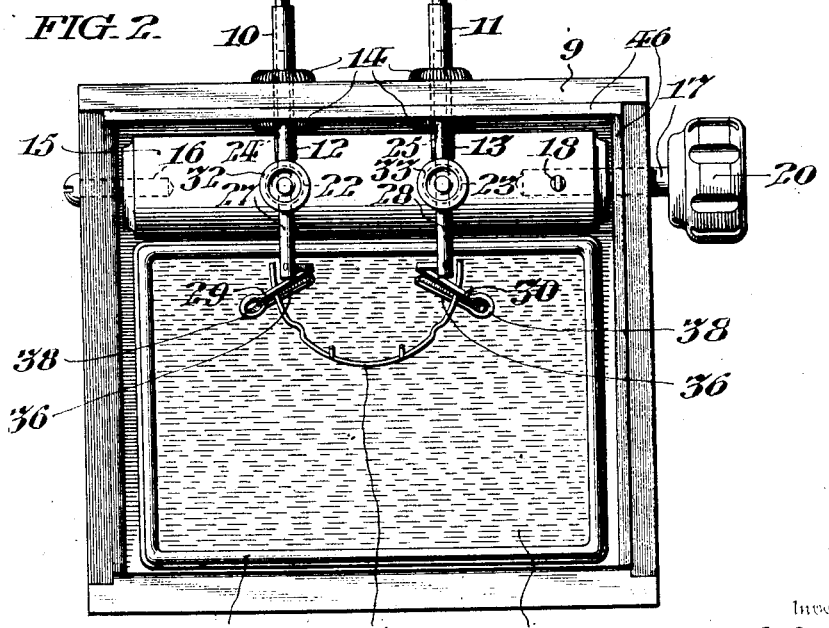

E. H. ANGLE & A. H. KETCHAM.
ANNEALING AND TEMPERING APPARATUS.
APPLICATION FILED MAY 6, 1914.

1,112,750.

Patented Oct. 6, 1914.
2 SHEETS—SHEET 2.

Inventors
Edward H. Angle &
Albert H. Ketcham,

Witnesses
John C. Bergner
Thomas W. Kerr, Jr.

Attorneys

UNITED STATES PATENT OFFICE.

EDWARD H. ANGLE, OF NEW LONDON, CONNECTICUT, AND ALBERT H. KETCHAM, OF DENVER, COLORADO.

ANNEALING AND TEMPERING APPARATUS.

1,112,750.  Specification of Letters Patent.  Patented Oct. 6, 1914.

Application filed May 6, 1914. Serial No. 836,617.

*To all whom it may concern:*

Be it known that we, EDWARD H. ANGLE, residing at New London, in the county of New London and State of Connecticut, and Albert H. Ketcham, residing at Denver, in the county of Denver and State of Colorado, have jointly invented certain new and useful Improvements in Annealing and Tempering Apparatus, whereof the following is a specification, reference being had to the accompanying drawings.

Our invention relates to the art of annealing and tempering, and is directed particularly to that class of devices in which the annealing operation is effected by passing an electric current through the article to be treated, and is especially applicable to mechanism for treating dental regulating arches.

The principal objects of our invention are, to provide means for movably holding a dental regulating arch in circuit with suitably disposed electrical contact terminals; and to provide a bath so disposed with respect to said holding means that said dental regulating arch is contemporaneously plunged into said bath when said holding means is moved to break said circuit.

Other objects of our invention are, to provide means for holding a dental regulating arch in such relation to the bath that when shifted to immerse the arch, the plane of said arch will be caused to assume a position substantially coincident with the plane of the surface of said bath; to provide a closed casing for said holding means; to provide said casing with an eyesight aperture through which the operator may peer; and to provide means exterior to said casing for operating said holding means.

Specifically stated, our invention comprehends a casing having stationary electrical contact terminals; a rotary shaft carrying spaced holders respectively provided with spring clips and having electrical contact members engageable with said contact terminals; and a bath into which said clips may be dipped by the oscillation of said shaft upon its axis to break the electrical contact.

Our invention further includes all of the various novel features of construction and arrangement hereinafter more definitely specified.

Figure 3:
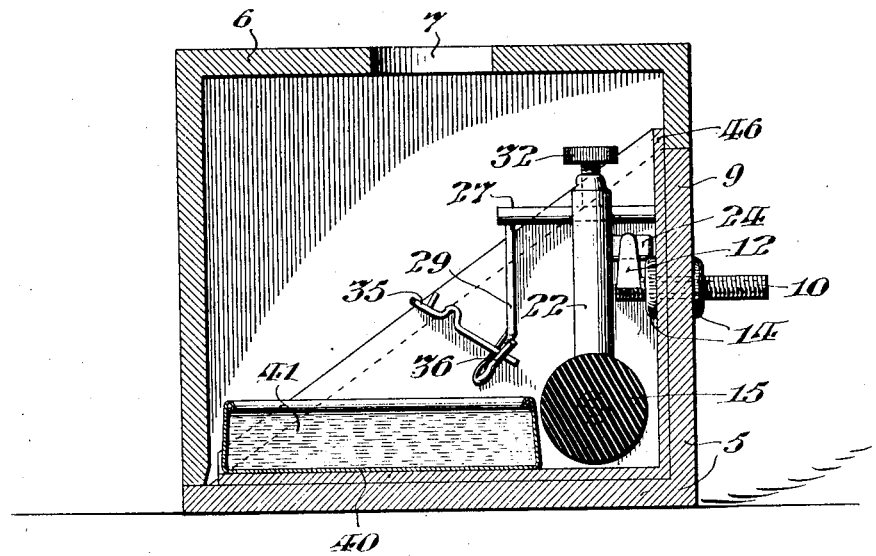
Figure 4:
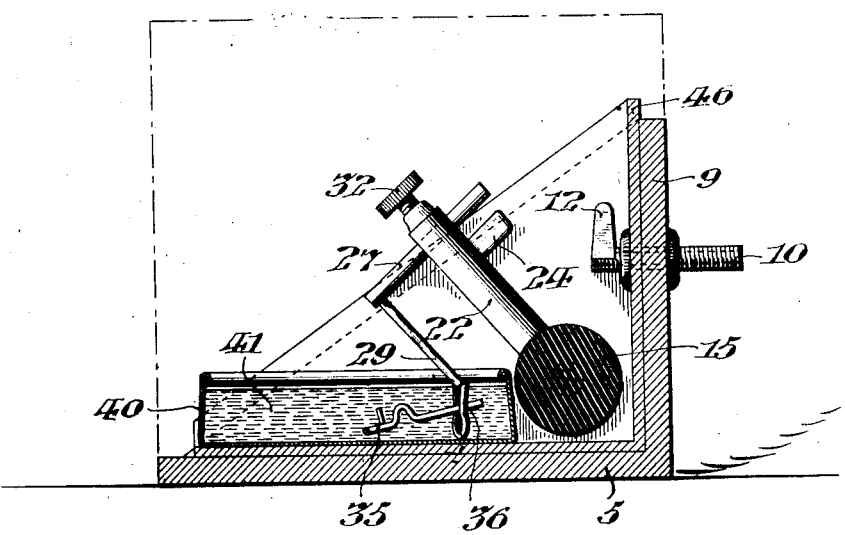

In the accompanying drawings, Figure 1, is an exterior perspective view of our annealing and tempering apparatus. Fig. 2, is a plan view of said apparatus, showing the cover removed and the operative mechanism in position to close the circuit through the article being treated. Fig. 3, is a central transverse vertical sectional view of said apparatus, showing the cover in place and the operative mechanism in the position corresponding to the position shown in Fig. 2. Fig. 4, is a view similar to Fig. 3, but showing the operative mechanism disconnected from the electrical terminals and in position to immerse the article being treated, the cover being removed and indicated in dot and dash lines.

In said figures, the casing is rectangular in form and comprises the body 5, which carries the operative mechanism, and the lid or cover 6, which is provided with an eyesight aperture 7, centrally disposed in the top wall thereof, although it may be otherwise disposed to suit the convenience of the operator. The rear wall 9, of the casing body 5, carries the adjustable terminal sockets 10, and 11, respectively provided with bifurcated spring contacts 12, and 13, and secured therein by the thumb-nuts 14, which are in threaded engagement therewith, and arranged to be jammed against the inner and outer surfaces respectively of said wall 9, to hold the terminals in any desired adjusted position.

In the rear lower angle of the casing body 5, is suitably mounted the shaft or cylinder 15, formed of insulating material and journaled for oscillation upon suitable trunnions 16, and 17, the latter being secured thereto by the pin 18, and having the thumb-wheel 20, disposed exterior to the casing body 5, by which said shaft or cylinder may be actuated.

The insulated cylinder 15, carries a pair of radially extending standards 22, and 23, arranged to be moved in planes with the axis of the respective sockets 10, and 11, and said standards are provided with laterally extending contact members 24, and 25, also extended in said planes and arranged to be received between the bifurcated leaves of the spring fingers 12, and 13, as shown in Figs. 2, and 3, to form the electrical connection with the terminal sockets 10, and 11, respectively.

The standards 22, and 23, carry holders which comprise cylindrical bars 27, and 28, having spring clips 29, and 30, and which are adjustably fitted in suitable transverse apertures near the upper end of the standards 22, and 23, respectively, and held in adjusted position by suitable thumb-screws 32, and 33. The spring clips 29, and 30, are preferably formed of half round wire depending from the bars 27, and 28, each having its free end portions 36, slightly twisted, directed obliquely outward, and bent back upon itself by forming the bight 38.

Disposed closely adjacent to the cylinder 15, is a bath reservoir or tray 40, of suitable depth to contain a requisite supply of fluid 41, comprising a tempering bath for the immersion of the dental regulating arch 35, which is carried by the spring clips 29, and 30, and which is heated by its own resistance to the electric current, which may be passed therethrough when the electrical contacts are made. Electric current may be supplied to the apparatus by a conductor whose leads 42, and 43, are respectively provided with suitable terminal plugs 44, and 45, which may be removably engaged with the terminal sockets 10, and 11, respectively, as shown in Fig. 2.

It may be readily seen that when the cylinder 15, is oscillated by means of the thumb-wheel 20, from the position shown in Figs. 2, and 3, to break the electrical circuit by withdrawing the contact members 24, and 25, from the spring fingers 12, and 13, as shown in Fig. 4, said holders will be dipped into the tempering bath and the article carried thereby will be immersed therein contemporaneously with the breaking of said circuit. It will be further noted that the free end portions of the clips 29, and 30, are disposed at such an angle and are so relatively twisted that the dental regulating arch 35, to be treated, is held when in circuit with the conductor, in such inclined angular position that when the cylinder 15, is oscillated toward the left, or anti-clockwise, said arch will be swung in an arc of a circle, its plane gradually assuming the plane of the surface of the bath, until said article reaches the position to be immersed, when its plane will be substantially coincident with the plane of the surface of the bath and the entire length of the arch instantly plunged into said bath, whereby a uniform tempering throughout the full extent of the arch will be effected.

It has been found convenient to so form the casing that the parting line between the lid or cover 6, and the body 5, will extend along the bottom wall of the body 5, and obliquely upward toward the back along the side walls thereof to a point adjacent to the top wall of the lid or cover 6, as best shown in Fig. 1, so that when said lid or cover 6, is removed, free access may be had to all of the operative parts carried by the casing body 5. The casing may preferably be covered with leather or other suitable material upon its exterior surface, but is preferably lined with a waterproof material, so that any splashing or spilling of the bath fluid will have no deleterious effect upon the device, which may be readily wiped out after using.

As shown in Figs. 2, 3, and 4, the casing body 5, is provided with an inner upwardly extending flange 46, which maintains the lid or cover 6, in proper position with respect to said casing body and enables the lid to be readily registered therewith.

We have referred to the special applicability of our mechanism for the treatment of dental regulating arches. Such small metal arches as used in modern orthodontia, require the utmost nicety of treatment in order to obtain exactly the proper degree of strength and elasticity. To obtain this it is not only necessary that the heating of the arch should be accomplished uniformly, and be interrupted at precisely the proper moment, but it is further necessary that the plunging of the arch into the cooling fluid shall be accomplished instantaneously, and that all parts of the arch should enter the bath at the same moment, so as to secure uniformity of result. Our invention accomplishes this desired result with great accuracy. But while our device is thus particularly designed and adapted to annealing and tempering dental regulating arches, it is to be understood that it may be as readily employed for similarly treating other devices and be modified accordingly, and therefore it is not desired to limit our invention to the precise details of construction and arrangement herein set forth, as it is obvious that various modifications may be made therein without departing from the essential features of the invention as defined in the appended claims.

Having thus described our invention, we claim:

1. An apparatus of the class described, comprising an electrical conductor, a tempering bath, a horizontal oscillatory shaft in proximity to the tempering bath, means for holding the article to be treated in fixed relation to the oscillatory shaft and in circuit with the conductor, and means whereby rotation of the shaft to immerse the article in the tempering bath breaks the electrical circuit.

2. An apparatus of the class described, comprising an electrical conductor having suitably spaced terminals, a tempering bath, an oscillatory shaft or cylinder having radially extending standards provided with contact members respectively engageable with said terminals, and holding means carried by said standards and arranged to support the article being treated which completes the electrical circuit when said contact members are in engagement with said terminals, and which is plunged into said bath when said shaft or cylinder is rotated to break the connection between the contacts and terminals.

3. An apparatus of the class described, comprising spaced electrical contact terminals, a tempering bath, an oscillatory cylinder or shaft having lateral projections carrying contact members respectively engageable with said terminals, holders adjustably supported by said projections and having spring clips for holding a dental regulating arch, said clips being so formed and twisted as to hold said arch in such angular relation to the plane of the surface of the bath when the electrical contacts are operatively engaged, that its plane will assume a position substantially coincident with the plane of the surface of the bath when plunged therein by the rotation of said shaft or cylinder to break the circuit.

4. An apparatus of the class described, comprising spaced electrical contact terminals, an oscillatory shaft or cylinder carrying electrically conducting projections relatively insulated and having contact members respectively arranged to engage and disengage said terminals by the movement of said shaft, holders adjustably mounted in said projections and having spring clips depending therefrom whose free end portions are directed obliquely outward and returned upon themselves, for holding a dental regulating arch in circuit with said terminals and in such angular relation with respect to the surface of the bath that when said cylinder or shaft is rotated to break said circuit, the plane of the arch will substantially assume the plane of the surface of the bath when plunged into said bath.

5. An apparatus of the class described, comprising a casing, electrical contact terminals in said casing, an oscillatory mounting carrying relatively insulated spaced supports having means for electrically engaging said terminals, means adjustable in said supports for holding a dental regulating arch in circuit with said terminals, and a closure for said casing having an eyesight aperture therein through which the operator may peer.

6. An apparatus of the class described, comprising a casing, electrical contact terminals in said casing, an oscillatory mounting carrying relatively insulated spaced supports respectively having means for electrically engaging said terminals, means adjustably mounted in said supports for holding a dental regulating arch in circuit with said terminals, a bath into which said arch may be plunged by the movement of said mounting to break said circuit, and a closure for said casing having an eyesight aperture therein through which the operator may peer.

7. An apparatus of the class described, comprising a casing having a removable closure and provided with an eyesight aperture, an electrical conductor, an oscillatory mounting carrying relatively insulated spaced supports having means for electrically engaging said conductor, means carried by said supports for holding a dental regulating arch in circuit with said conductor, a bath into which said arch may be plunged by the movement of said mounting to break the circuit, and means exterior to said closure for operating said oscillatory mounting.

In testimony whereof, we, EDWARD H. ANGLE and ALBERT H. KETCHAM, have hereunto signed our names at Denver, Colorado, this second day of May, 1914.

EDWARD H. ANGLE.
ALBERT H. KETCHAM.

Witnesses:
SAMUEL E. FOWLER,
S. A. SCOTT.

Copies of this patent may be obtained for five cents each, by addressing the "Commissioner of Patents, Washington, D. C."